United States Patent
Tourne et al.

(10) Patent No.: US 11,443,305 B2
(45) Date of Patent: Sep. 13, 2022

(54) CONTEXT AUGMENTATION FOR PROCESSING DATA FROM MULTIPLE SOURCES

(71) Applicant: The Beans, San Francisco, CA (US)

(72) Inventors: Matthieu Tourne, San Francisco, CA (US); Melissa Pancoast, San Francisco, CA (US); Danton Rodriguez, San Francisco, CA (US)

(73) Assignee: THE BEANS, San Francisco, CA (US)

( * ) Notice: Subject to any disclaimer, the term of this patent is extended or adjusted under 35 U.S.C. 154(b) by 391 days.

(21) Appl. No.: 16/054,562

(22) Filed: Aug. 3, 2018

(65) Prior Publication Data
US 2019/0205872 A1 Jul. 4, 2019

Related U.S. Application Data

(60) Provisional application No. 62/612,202, filed on Dec. 29, 2017.

(51) Int. Cl.
*G06Q 20/38* (2012.01)
*H04W 4/029* (2018.01)
(Continued)

(52) U.S. Cl.
CPC ......... *G06Q 20/3821* (2013.01); *G06F 9/466* (2013.01); *G06F 16/219* (2019.01);
(Continued)

(58) Field of Classification Search
CPC .. G06Q 20/227; G06Q 20/36; G06Q 20/3821; G06Q 20/4014; G06Q 40/12;
(Continued)

(56) References Cited

U.S. PATENT DOCUMENTS 7,370,014 B1 * 5/2008 Vasavada ............... G06Q 20/04
705/40
8,296,206 B1 * 10/2012 Del Favero ............ G06Q 40/02
705/1.1
(Continued)

OTHER PUBLICATIONS

McAuley et al., "The Dataware manifesto," 2011 Third International Conference on Communication Systems and Networks (COMSNETS 2011), 2011, pp. 1-6.*
(Continued)

*Primary Examiner* — Steven S Kim
(74) *Attorney, Agent, or Firm* — Womble Bond Dickinson (US) LLP

(57) ABSTRACT

Various embodiments are directed to the centralized processing of data from multiple sources and/or augmenting the data with contextual data from multiple sources across different accounts and systems. Embodiments disclose a context augmentation module to supplement and aggregate data from multiple sources, extrapolate contextual data, and augment the data with the contextual data on transactions conducted by a user. By gathering data from multiple sources associated with the user, contextual data may be extrapolated and can be applied to incoming transaction data about a transaction conducted by the user. The contextual data may also be applied to classify the transaction data, increasing the total number of transactions as well as contextualizing the ones with additional corresponding data. Proper contextualization and classification of the transaction data of users across multiple accounts, platforms, sources, and systems is beneficial and advantageous in resolving problems associated with data processing across multiple sources and platforms.

20 Claims, 9 Drawing Sheets

(51) Int. Cl.
*H04L 67/50* (2022.01)
*G06Q 20/40* (2012.01)
*G06Q 40/00* (2012.01)
*G06F 16/22* (2019.01)
*G06F 16/28* (2019.01)
*G06F 16/21* (2019.01)
*G06F 16/23* (2019.01)
*G06F 16/2455* (2019.01)
*G06F 9/46* (2006.01)
*G06N 3/08* (2006.01)

(52) U.S. Cl.
CPC .......... *G06F 16/2237* (2019.01); *G06F 16/23* (2019.01); *G06F 16/24564* (2019.01); *G06F 16/285* (2019.01); *G06N 3/08* (2013.01); *G06Q 20/4014* (2013.01); *G06Q 40/12* (2013.12); *H04L 67/22* (2013.01); *H04W 4/029* (2018.02)

(58) Field of Classification Search
CPC ...... H04L 67/22; H04L 67/306; H04W 4/029; G06F 16/219; G06F 16/2237; G06F 16/23; G06F 16/24564; G06F 16/285; G06F 9/466; G06N 20/00; G06N 3/08
See application file for complete search history.

(56) References Cited

U.S. PATENT DOCUMENTS

| | | | | |
|---|---|---|---|---|
| 9,292,623 | B2* | 3/2016 | Walker | G06F 16/258 |
| 9,529,917 | B2* | 12/2016 | McConnell | G06F 16/9535 |
| 10,013,654 | B1* | 7/2018 | Levy | G06N 3/08 |
| 10,374,996 | B2* | 8/2019 | Saoji | G06Q 30/02 |
| 2003/0204460 | A1* | 10/2003 | Robinson | G07F 7/1016 705/35 |
| 2009/0222364 | A1* | 9/2009 | McGlynn | G06Q 40/02 705/30 |
| 2010/0042470 | A1* | 2/2010 | Chang | G06Q 30/0241 705/14.64 |
| 2010/0050101 | A1* | 2/2010 | Baik | G06F 16/258 715/764 |
| 2010/0131498 | A1* | 5/2010 | Linthicum | G06F 16/338 707/E17.046 |
| 2010/0274815 | A1* | 10/2010 | Vanasco | G06Q 10/107 707/798 |
| 2011/0054981 | A1* | 3/2011 | Faith | G06Q 30/0269 705/7.36 |
| 2012/0078727 | A1* | 3/2012 | Lee | G06Q 30/02 705/14.66 |
| 2013/0036117 | A1* | 2/2013 | Fisher | G06F 16/487 707/736 |
| 2014/0032370 | A1* | 1/2014 | Rose | G06Q 30/06 705/26.81 |
| 2016/0125524 | A1* | 5/2016 | Loskamp | G06Q 40/00 705/35 |
| 2019/0205993 | A1* | 7/2019 | Rodriguez | G06F 9/466 |

OTHER PUBLICATIONS

Moiso et al. "Towards a user-centric personal data ecosystem the role of the bank of individuals' data," 2012 16th International Conference on Intelligence in Next Generation Networks, 2012, pp. 202-209.*

* cited by examiner

CONTEXT AUGMENTATION FOR PROCESSING DATA FROM MULTIPLE SOURCES

BACKGROUND

Users are increasingly conducting more electronic and online transactions with various entities, which results in an abundance of electronic data affiliated with one user being processed and stored across multiple entities, vendors, platforms, and stored in various formats and security protocols. Electronic transactions conducted over the Internet create electronic documentation of the transactions, including metadata that may be stored and analyzed for various purposes. However the electronic documentation is often only processed and stored with the entity with which the user conducted the transaction. Having a user's data divided across different platforms can be difficult to manage, organize, and process because different platform may use different techniques in organizing and classifying data, and may gather and store different data that is relevant to the particular platform. Furthermore, with the plurality of types of electronic transactions that users can conduct, data processing, or even transaction processing platforms encounter the technical difficulties in parsing through, processing, and categorizing transaction data in large volumes more intelligently.

BRIEF DESCRIPTION OF THE DRAWINGS

Various embodiments in accordance with the present disclosure will be described with reference to the drawings, in which.

DETAILED DESCRIPTION

Figure 1:
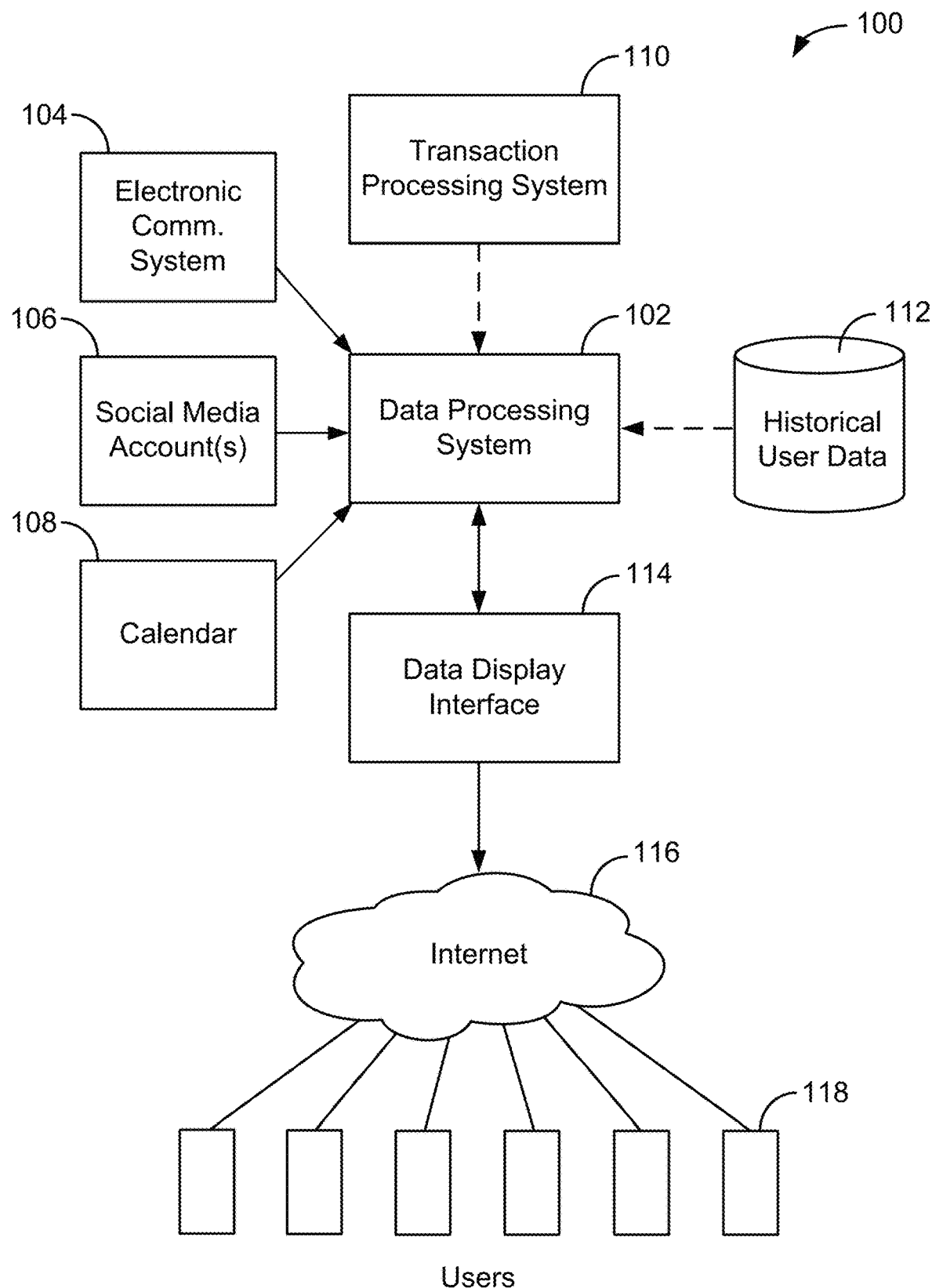
FIG. 1 illustrates an example of a networked computing system for contextualizing data from multiple sources, in accordance with various embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the aforementioned and other deficiencies experienced in conventional approaches for processing transaction and payment data. In particular, various embodiments are directed to processing data, particularly augmenting transaction data with contextual data across different accounts and systems. Transactions may be conducted using a variety of personal resources, that according to various embodiments throughout this disclosure, may include, but are not limited to, assets (e.g., real estate properties), stock, mutual funds, currencies, cash, cryptocurrencies, bonds, commodities, or any other suitable financial instrument having value. Personal resources may be exchanged for other financial instruments, goods, and/or services. Personal resources may also be gifted, donated, loaned, or otherwise transferred from one user to another user or entity. Aggregating, processing, analyzing, and centralizing data across multiple sources, platform, formats, and transmission protocols is already a technical challenge, and transaction data is even more difficult because of the number of different vendors, resources, currencies, types of transactions that a singular user may make. As such, embodiments herein described a technical solution to process data from multiple sources to extract contextual data that may be augmented to enrich raw transaction data from a transaction processing system. Doing so can centralize all data for transactions of a user that enables a user to intelligently and efficiently manage their transactions. Alternatively the transaction data becomes more manageable in transmitting to other entities (e.g., marketing and data analytics entities, service providers, transaction processing system, payment processing system, financial institutions, etc.) because more of the relevant context is contained with the transaction.

Embodiments of the invention address problems that users have in conducting more transactions using credit cards, digital wallets, digital currencies, and other electronic forms of payment. These electronic forms of payment enable users to conduct transactions online over the Internet, and create electronic documentation of the transactions, including metadata that may be stored and analyzed for various purposes. Traditionally many transactions were conducted with cash, and in-person for security reasons to authenticate the user and authorize the transactions. Online transactions involving financial resources and/or personal assets often involve the transmission of digital data and digital documentation that introduce many technical limitations in processing for analysis with respect to regulations in taxes, reporting, and/or other operations related to finances, currencies, securities, commodities, and/or assets. Furthermore, with the plurality of types of personal resources and assets that users can obtain, manage, and conduct transactions with, financial advising, transaction processing, or even payment processing platforms encounter the technical difficulties in parsing through, processing, and categorizing transaction data in large volumes more intelligently.

Various other functions and advantages are described and suggested below as may be provided in accordance with the various embodiments.

FIG. 1 illustrates an example of a networked computing system 100 for a centralized context augmentation data processing system (herein, may be referred to as "data processing system"). In this example, a computing system or server 102 (or a plurality thereof) may operate as a data processing system to augment contextual data onto raw data, such as raw transaction data, which may include data from an aggregator or data generated in payment processing. In some embodiments, raw data generated in payment processing may be a transaction string and aggregated by the aggregator. The data processing system 102 may intake raw transaction data from a transaction processing system 110, such as a credit card service, bank, issuer, or any other payment processing service or financial transaction processor that processes payments of transactions between users, other users, service providers, and/or retailers. Transactions may include, but are not limited to, paying for utilities, transportation, clothing, entertainment, food, grocery, taxes, rent, mortgage, etc. Other examples of transactions may also include refunds, reimbursements, price adjustments, and other modifications to transactions. In some embodiments, a transaction processing system 110 may be in communication with a financial institution, such as a bank or an issuer. In another embodiment, the data processing system 102 may store and have access to transaction data stored in an internal or external transaction database or historical user data database 112. Other databases or systems that the data processing system 102 may be in communication with may include a user profile database or a financial account/profile database. Transaction data may include, for example, user identification, amount and type of payment, vendor, time, location, and/or the item or service. Similarly, the transaction processing system 110 may be operated by the same entity as the data processing system 102, or may be an external entity to the data processing system 102.

The data processing system 102 may be in communication with a data display interface 114 to provide transaction and payment information to one or more client devices 108. The data display interface 114 may provide the contextualized or augmented transaction data to the client devices 118 for the display of a dynamic, interactive visual representation of the user's personal resource and asset data for user-intuitive management. Client devices 118 include devices through which a user can view, edit, access or otherwise interact with the contextualized transactions conducted for personal resource management. The client device 118 may include at least one form of input such as a keyboard, a touchscreen, a voice communications component such as a microphone, and at least one form of visual output such as a display and at least one form of input, such as a keyboard, touch screen, pointer, mouse, etc. The client devices 118 can include various computing devices such as speakers, receivers, smart phones, tablet computers, wearable computers (e.g., smart glasses or watches), desktop or notebook computers, and the like. The client devices 118 can communicate with the data display interface 114 and data processing system 102 over at least one network 116, such as the Internet, a cellular network, a local area network (LAN), an Ethernet, Wi-Fi, or a dedicated network, among other such options.

The data processing system 102 may be enabled to pull in external data from one or more data collection systems to extract contextual data to augment to the raw transaction data from the transaction processing system 110. In this embodiment, the data processing system 102 may retrieve or access data from an electronic communications system 104 for emails, messaging, SMS, or other electronic communications of a user to analyze for transaction-related communications to extract data from. For example, a user may receive an email containing a receipt to his or her personal email; the data processing system 102 may communicate with the email provider 104 to retrieve the email text to parse and extract the relevant information from that email, such as amount, payment use, vendor, date/time of the transaction, quantity, and products or services purchased. In another example, the data processing system 102 may retrieve data from a user's social media accounts 106, such as Facebook, Instagram, LinkedIn, Swarm, etc. to extract relevant contextual data. For example, a user checking into a restaurant and "liking" it can be indicative of a potential transaction or future transactions the user may have with that restaurant. In another example, if the user and a group of friends check into the same restaurant, then the associated transaction may be for a large amount because it was a dinner for a large party. In an embodiment the data processing system 102 may also retrieve contextual data from a user's calendar 108 to predict and correlate transactions with the user's calendar appointments.

Figure 2:
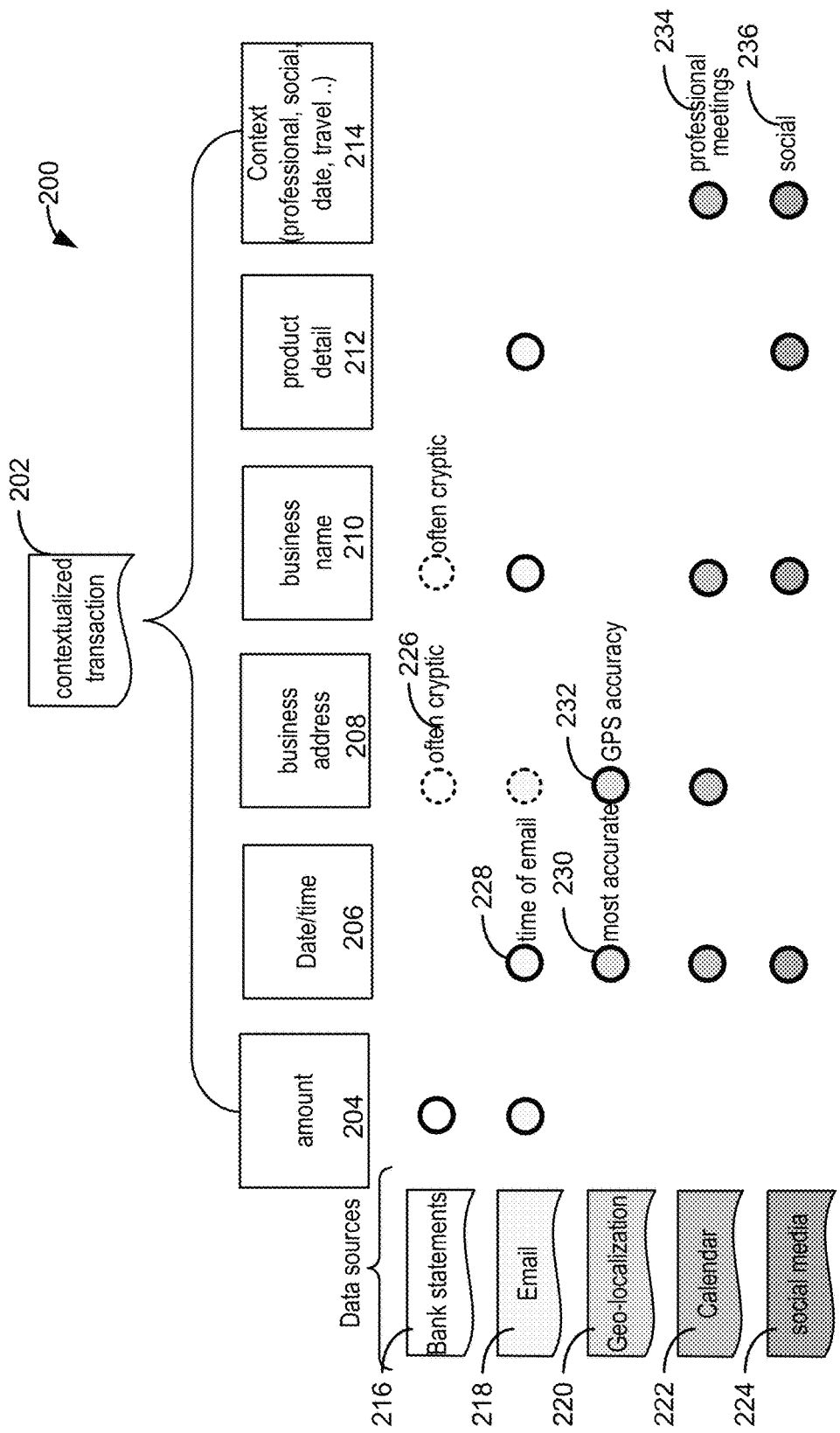
FIG. 2 illustrates an example overview of contexts that can be augmented to data from multiple sources, in accordance with various embodiments of the present disclosure.

FIG. 2 illustrates an example overview 200 of contexts that can be augmented to transaction data by extracting data from multiple sources, in accordance with various embodiments of the present disclosure. Providing context to a transaction aids the data processing system to categorize and/or classify the transaction. For example, a transaction that occurs at a social event may be processed differently than a professional event, because expenses from a professional event may be expensed or have a different budget than a user's personal social budget. Transaction made on vacation may also be processed and classified differently from day-to-day transactions. Fixed costs (e.g., rent, mortgage, utilities, etc.) may also be processed and classified differently from a purchase of hiking boots or a celebratory dinner, for example. For the data processing system to determine and generate this contextual data to augment the raw transaction data, the data processing system may retrieve data from multiple data sources or data collection systems 216-224. Examples of data sources may include, but is not limited to, bank statements 216 from financial institutions, email 208 or other electronic communication, geo-location 220 or other device-based locator (e.g., Global Positioning System "GPS" location from a smart phone), calendar(s) 222 (e.g., iCal, Google calendar, Outlook calendar, etc.), and/or social media account(s) 224 (e.g., Facebook, Instagram, LinkedIn, etc.).

However, data from each data source likely does not have all the information needed to make a raw transaction into a contextualized transaction 202. A contextualized transaction 202 may include various data, such as an amount 204, date/time 206, business address 208, business name 210, product detail 212, and context 214. The context 214 may indicate whether the transaction is for a social event, a professional event, travel/vacation, a romantic date, etc. Data from the different data sources may provide various pieces of the contextualized transaction, but with varying levels of accuracy, frequency, or confidence. For example, a bank statement may have, with high fidelity, the amount of the transaction, but the business address 208 may often be cryptic 226 or the business name may be corrupted 210 because of a shortened vendor name. In another example, an email 218 with containing a transaction receipt may have an accurate amount 204 and time of email 228, however the time of email may or may not indicate an accurate time of the transaction itself. The email 218 may also have a business 210 and product detail 212, however a business address 208 may not be reliable. The geo-location data 220 may include accurate date-time 230 and business address 208 with GPS accuracy 232. In another example, calendar data 222 may include accurate date/time 206, and may also include business address 208 and business name 210 if entered by the user or downloaded from a generated invitation. The calendar data may also include context 214 indicating a type of event, in this example, a professional meeting 234. In another example, data from social media 224 may include date/time 206, business name 210, product detail 212, and also context 214, in this example, a social event 236.

Embodiments of the invention may synchronize data from the different data sources and map pieces of transactional data from the different data sources to generate contextual data that may be augmented to raw financial transaction data. The data processing system may retrieve, process, parse, and analyze different types of data. A new bank transaction may be raw transaction data, including transaction information from a bank or a bank data aggregator. As mentioned, the most dependable data of a bank transaction is the amount of the transaction. A date in a bank transaction is typically the "day posted", which is not the transaction date, but the day that the transaction is cleared at the bank. Furthermore, the "day posted" does not include the time of the transaction and the vendor name or business name is often corrupted or altered for bank transaction processing.

Another data type may include an email receipt. Email receipts are typically sent upon completion of a transaction and thus include an accurate date and time of the actual transaction. The email receipt may also include a bounty of other information, such as business address, delivery address, product details, amount of the transaction, quantity, and/or payment type. The data processing system may retrieve and process other data including geo-location data. Geo-location data may be used to positively identify the location where the transaction took place. It may also be used to supply a date and time range for a bank transaction. The geo-location data may include the business address and GPS location of where the transaction occurred. Another data type that the data processing system may process is calendar data. Calendar data may be in the form of calendar invitations, which may include date, time, location, purpose (e.g., professional or non-professional meeting), and other participants, guests, or invitees. The data processing system may also retrieve and process social media data. Social media can provide date, time, location, other people who were present, sentiment (e.g., reactions, likes, etc.) and product details, as well as broader social network data about the user.

Figure 3:
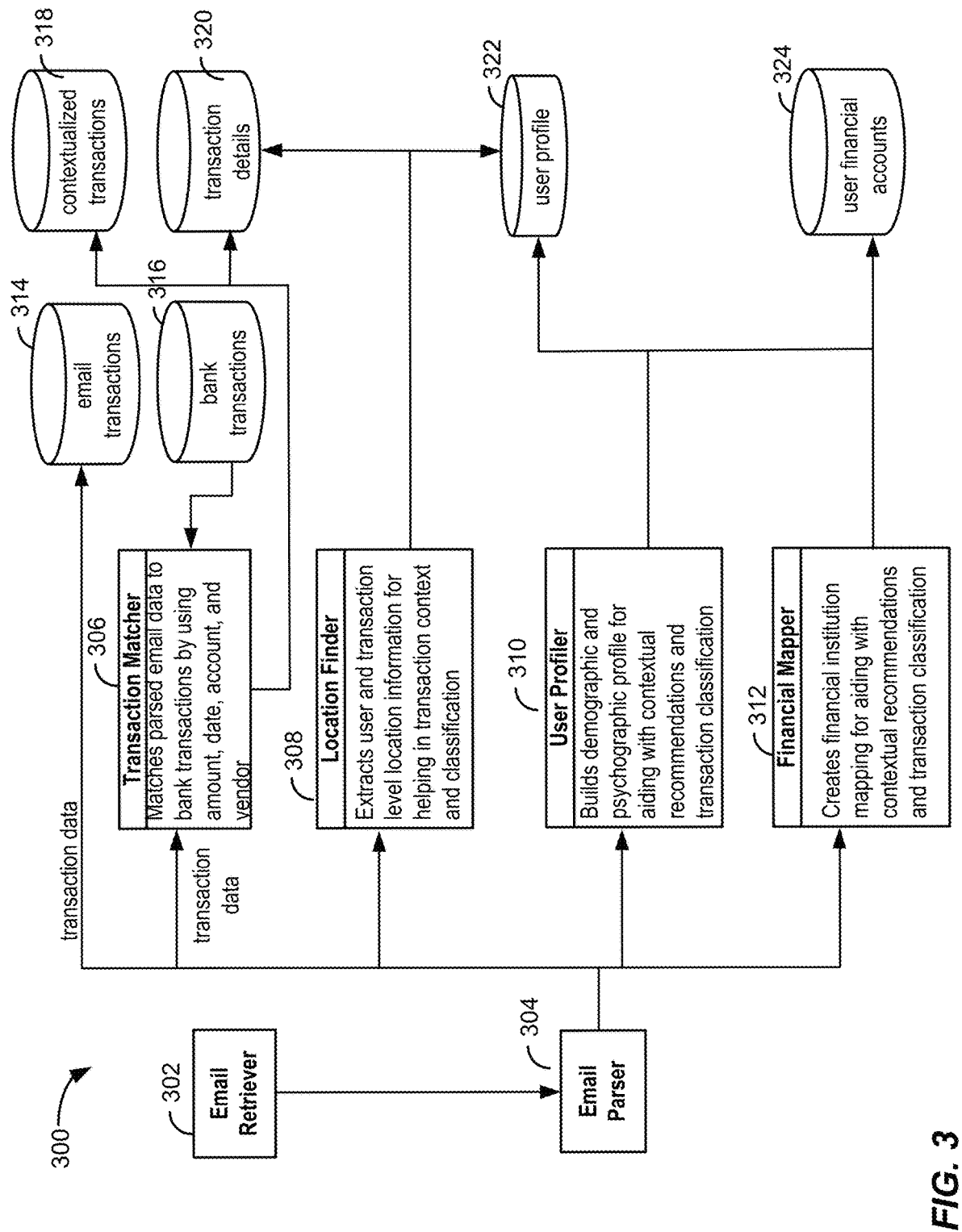
FIG. 3 illustrates an example process of contextualizing and augmenting data from multiple sources, in accordance with various embodiments of the present disclosure.

FIG. 3 illustrates an example process and data processing system 300 of contextualizing and augmenting data from multiple sources, in accordance with various embodiments of the present disclosure. According to various embodiments, the data processing system 300 may receive transaction data associated with a transaction and process the transaction data to retrieve account information of a user conducting the transaction. The data processing system may then query one or more data collection systems for external data correlated with the user, such as a bank transactions database or system 316, or an email processing system 314. The data processing system 300 may extract context data from the external data correlated with the user based at least in part on the transaction data and analyze the context data to determine relevant context data. The context data may then be augmented to the transaction data.

Embodiments of the invention may include an on-boarding process for users, where the user is prompted to authorize the data processing system to be able to connect to the user's accounts with other data collection systems or sources. An email retriever 302 of the data processing system may request access to the user's email account, social media accounts, calendar, and/or financial accounts. For electronic communication systems, there may already be existing tags which the data processing system may use to retrieve the relevant emails that contain transaction data. For example, the email retriever 302 of the data processing system 300 may retrieve from the electronic communication system only emails that have tags related to financial accounts, credit cards, credit card payments, bills, subscription information, loan information, loan payments, travel data, information about user location or where the user plans to be, where the user may live, etc.

In another embodiment, the email retriever 302 may receive electronic communications without tags and the email parser 304 may parse the emails to apply custom tags. The data processing system 300 may download all the electronic communications from the electronic communication system, and apply the data processing system's own labels or tags that classify the characteristics or content of the electronic communications. As such, the data processing system 300 would process all electronic communications, apply custom tags, and only retain electronic communications relevant to transactions.

The emails with specified tags are retrieved and then parsed by an email parser 304 for classification of the retrieved emails. The email parser 304 may classify the emails by type and use various parsing methods and algorithms to extract additional data. Additional data from the emails may include, without limitation, transaction identification data, user demographic information, user psychographic information, financial institution information, employment information, financial profile information, user home location, vacation information, and/or peer to peer payment information (e.g., Venmo, Paypal, Google Wallet, Apple Pay, etc.). Shipping information in an email, such as a shipping address, may indicate a user's home address or work address. Other data from the emails may provide demographic or psychographic data of the user. Payroll information may also be in emails, which can provide employment information about the user to the data processing system. Other data in emails that the data processing system is extracting may include potential reimbursements, credit score, vacations, or business trips. The email parser 304 may parse the retrieved emails to generate transaction data that may be processed by the transaction matcher 306, location finder 308, user profilers 310, and financial mapper 312. The data processing system 300, specifically the email retriever 302 may access accessing electronic communication from the one or more data collection systems and analyze the electronic communication including one or more tags. The tags indicate characteristics of the electronic communication or content of the electronic communication, and the email retriever 302 may retrieve relevant electronic communication data from the electronic communication based on the tags. The email parser 304 may then parse the relevant electronic communication data having specified tags indicating transaction characteristics. The transaction characteristics tags may include user characteristics, geolocation or device characteristics, or payment processing characteristics. The email parser 304 may classify the relevant electronic communication data based some of the identified transaction characteristics and classifiers. The email parser 304 may then generate transaction data based on the classifiers and the tags.

The transaction matcher 306 may match parsed email data to bank transactions from the bank transactions system 316. The matching may be based using the amount, date, account and/or vendor of the transaction. In some embodiments, transaction matcher 306 of the data processing system 300 may access data from a transaction processing system, such as a bank 316, payment processing system, and/or other financial institution. The transaction matcher 306 of the data processing system 300 may analyze the transaction data from the email parser 304 and then access the transaction processing system, including a transaction database of processed transactions. Each processed transaction may include various parameters, such as an amount, date of the transaction, an associated user account, or a vendor. The transaction matcher 306 may match at least one parameter of the processed transaction with the specified tags or classifiers from the transaction data. When a match is found, then the transaction data may be augmented with the relevant context data based at least in part on the matched parameter(s).

The transaction matcher 306, after augmenting the transaction data with contextual data, may store the contextualized transaction in a contextualized transactions database 318. Alternatively, the data processing system 300 may also access the contextualized database 318 to correlate the transaction data from the email parser with other tags in the contextualized database to help categorize the transaction data and apply similar contextual data. The classified transactions database 318 may include purchase order contents or transaction location estimation. Classified transactions are enriched with context from the raw transaction data, enabling faster and more accurate categorization. More accurate categorization of transactions may aid the user or other entities to drive spending tracking and reporting, allowing for better behavioral and product/service recommendations. The augmented data may additionally enable improved prediction of human behavior and intent.

The data processing system 300 may also include a location finder 308, in which the location finder extracts user and transaction level location information for helping in transaction context and classification. The location finder 308 may access at least one of a transactions database 320 or a user profile database 322, of a transactions processing system or other external entity. The location finder 308 may analyze the transaction data to extract the geolocation or the device characteristics from the tags of the transaction data and generate the relevant context data based on the geolocation or the device characteristics correlated with data from the user profile database 322 or the transactions database 320. The transaction data may then be augmented with the relevant context data. The transactions data 320 may include product level breakouts for transactions enabling more accurate forecasting of spending behavior which drives spending tracking and reporting enabling better behavioral and product/service recommendations. The user profile database 322 may include home location, employer, annual income, income sources, age, gender, assets, debt, credit score, education level, shopping preferences, online service usage, and/or current financial needs.

The data processing system 300 may also include a user profiler 310, in which the user profiler builds demographic and psychographic profiles for each user to aid in behavioral change recommendations and transaction classification. The user profiler 310 may access a user profile database 322 of a plurality of user profiles. Each user profile may include user characteristics, such as age, gender, employment, demographic data, behavioral data, historical data, or psychographic data, etc. The user profiler 310 may locate the user and the account information of the user in the user profile database 322 and analyze the transaction data to extract the user characteristics from the tags of the transaction data. The user profiler 310 may then generate the relevant context data based at least in part on the user characteristics.

The data processing system 300 may also include a financial mapper 312 to create financial institution mapping for aiding with behavioral change recommendations and transaction classification. The financial mapper 312 may access a financial profile database 324, where the financial profile database includes a financial profile that corresponds to the user. The user's financial profile may be located in the financial profile database so that the financial mapper 312 may analyze the transaction data to extract the payment processing characteristics from the tags of the transaction data. The financial mapper 312 may then generate the relevant context data based at least in part on the financial profile of the user and the payment processing characteristics. The financial profile database 324 may include data on financial accounts, loans, credit cards, retirement, and other services information.

Figure 4:
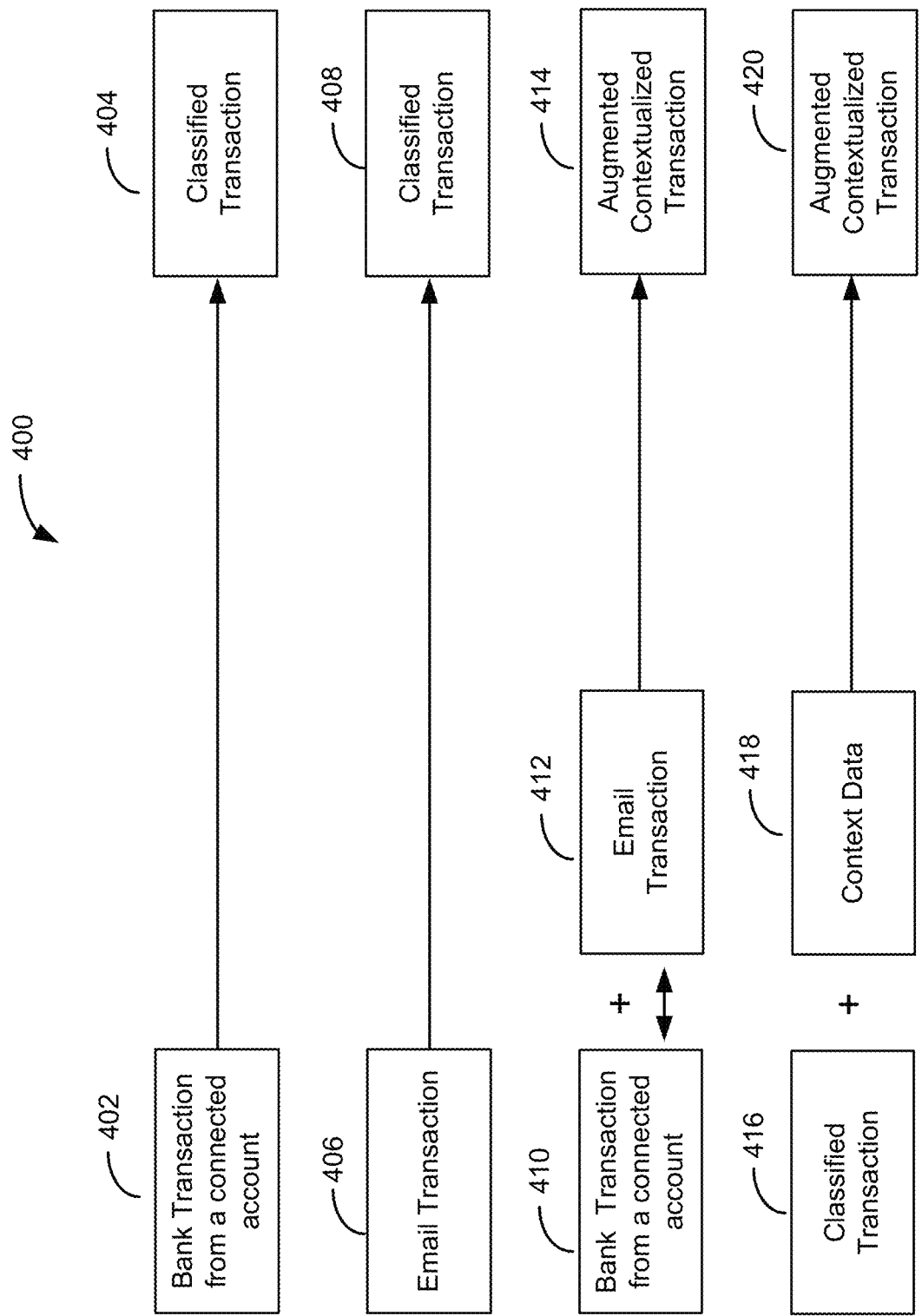
FIG. 4 illustrates an example process of supplementing or augmenting data with contextual data from multiple sources, in accordance with various embodiments of the present disclosure.

FIG. 4 illustrates an example process 400 of supplementing or augmenting data with contextual data from multiple sources, in accordance with various embodiments of the present disclosure. Each of these processes may be occurring in parallel as shown in FIG. 3 and each row illustrates how a transaction is processed to be augmented with contextual data by each different type of context from different data collection system or source. A raw bank transaction 402 may be connected to a user's account and converted into a classified transaction 404 by augmenting the raw transaction data with classifiers from the transaction matcher. A transaction retrieved from email 406 may be converted into a classified transaction 408 after being processed by the email parser, and may additionally be processed by a categorizer. In another embodiment, a bank transaction 410 from a connected account may be correlated with an email transaction 412 to extract contextual data and created an augmented contextualized transaction. 414. In another embodiment, a classified transaction 46 (e.g., output from the email parser 408 or transaction matcher 404) may be supplemented with context data 418 from another data source to create an augmented contextualized transaction 420.

Existing technology for processing financial transactions and data across different sources involves financial services companies scraping for data and/or buying it from another data source that scraped for relevant data. A trigger indicating to a financial processing system that a transaction has occurred is when a user makes a purchase using credit, debit, or check, for example. However, there is often a lag or delay, because it may take days for a transaction to post. In the case of checks, additional delays may occur between a check being given to a vendor and the vendor cashing it. Financial services rely on data provided by a third party aggregator, or scraped directly from an online view of transactions or bank statement. Raw transactional data is notoriously poor quality, with the most dependable data being the transaction amount and direction (e.g., income or payment). However, the transaction data is limited to the accounts a user has connected to the financial service. In the European Union, for example, banks are now required to provide consumers access to their data directly through an application programming interface (API).

Figure 5:
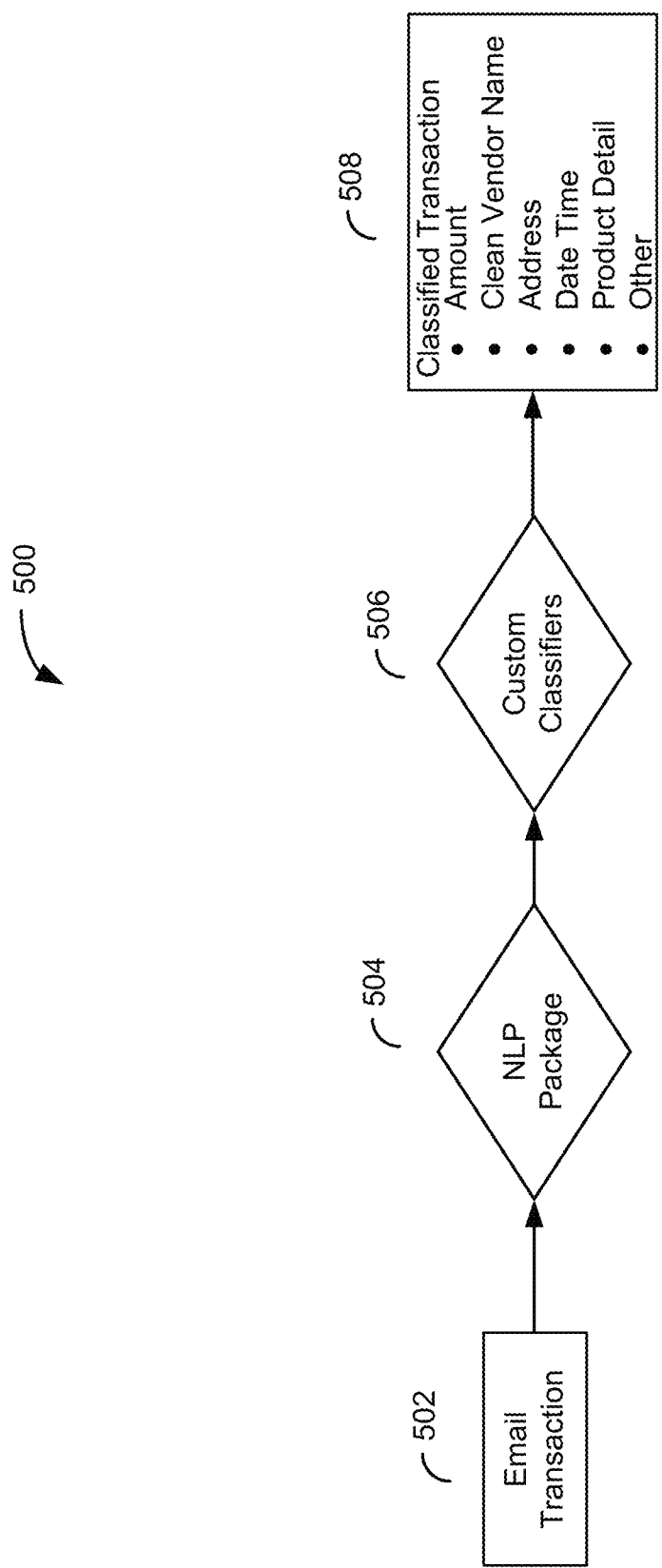
FIG. 5 illustrates an example process of extracting and structuring data with classifiers, in accordance with various embodiments of the present disclosure.

FIG. 5 illustrates an example process 500 of supplementing data with classifiers, in accordance with various embodiments of the present disclosure. The classified transaction may be supplemented with contextual data. An email transaction 502 may be processed by a natural language processing (NLP) algorithm 504 to determine relevant emails containing transaction information based on tags in the emails. Data may be structured, processed or interpreted with NLP algorithms and/or classifiers. A classifier is used to categorize, for example a custom NLP classifier is trained to identify emails that contain receipts for food delivery, or online shopping orders. The result is a structured transaction which originated from a place other than a bank, and which may contain information in addition to what is normally contained in a transaction. For example, emails containing receipts, order confirmations, shipping confirmations, etc. The email transaction 502 may be triggered by a user making a purchase using credit, debit, or check online or offline with a web enabled point of sale system. The email receipt is retrieved from a connected user's email inbox, and is parsed by the NLP package 504. In some embodiments, customer classifiers 506 may yield additional tags which are then added to the tags of the emails based on information that is parsed from the email transaction to create a classified transaction 508. The classified transaction 508 may then be enriched with context data and include the amount, clean vendor name, business address, date and time, product detail, and other contextual information. Typically for email transactions there is no lag or delay because if the payment processor is email enabled, or if it is an ecommerce site, the email receipt will be generated immediately. For example, a user connected their checking account, but who received an electronic communication containing a receipt for a transaction conducted with a credit card. The email communication containing the receipt provides data for an account not directly connected to the service.

Figure 6:
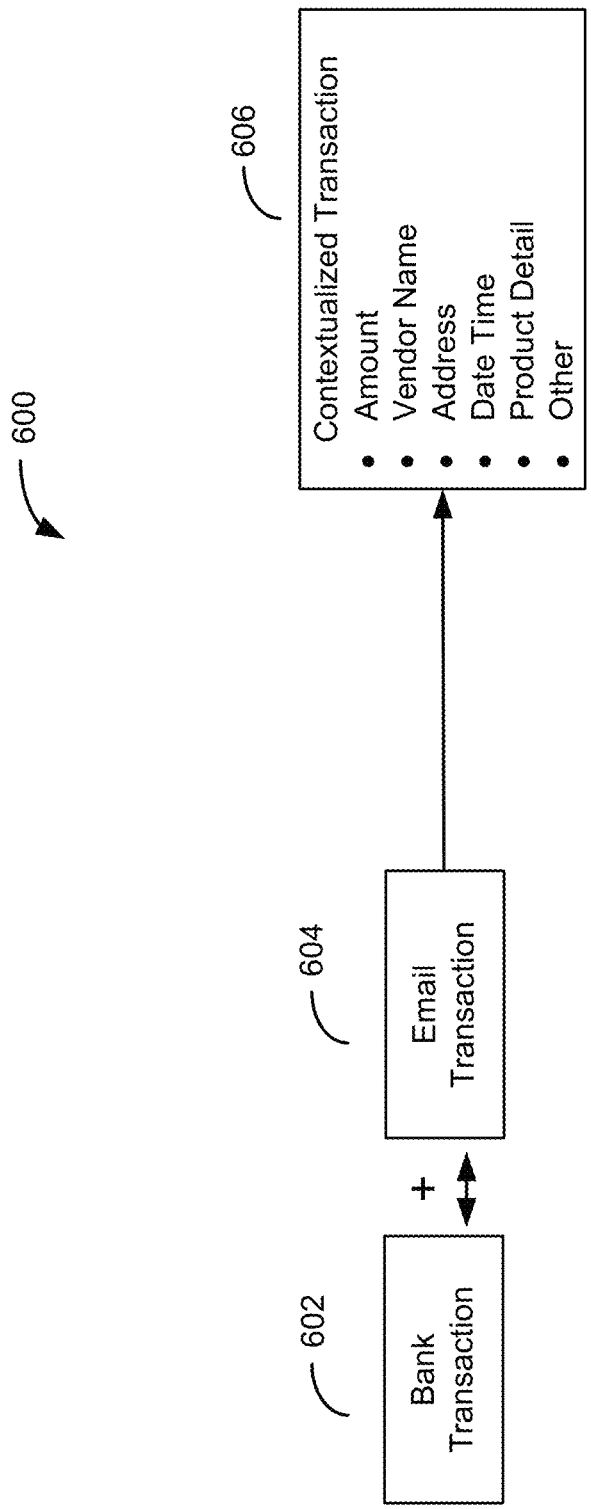
FIG. 6 illustrates an example process of augmenting data from multiple sources, in accordance with various embodiments of the present disclosure.

FIG. 6 illustrates an example process of augmenting data from multiple sources, in accordance with various embodiments of the present disclosure. The classified transaction may be augmented with contextual data. A raw bank transaction 602 may be matched with an email transaction 604 to create a contextualized transaction 606. The transaction may be triggered by a bank or email transaction that matches with an existing email transaction or classified transaction. The match criteria may include an exact amount, within a date range, and (if possible) statistical probability matching on a vendor name, for example. The transaction data may be augmented with additional data (such as location, date/time, product detail, etc.) that is mapped onto a transaction in the classified transaction database. A classified transaction 606 can originate as a bank transaction 602 or an email transaction 604, and may include an amount, vendor name, business address, date and time, product detail, and other contextual information. When a classified transaction is matched to a corresponding bank or email transaction, additional information is added to the classified transaction and they are merged to avoid duplication.

Figure 7:
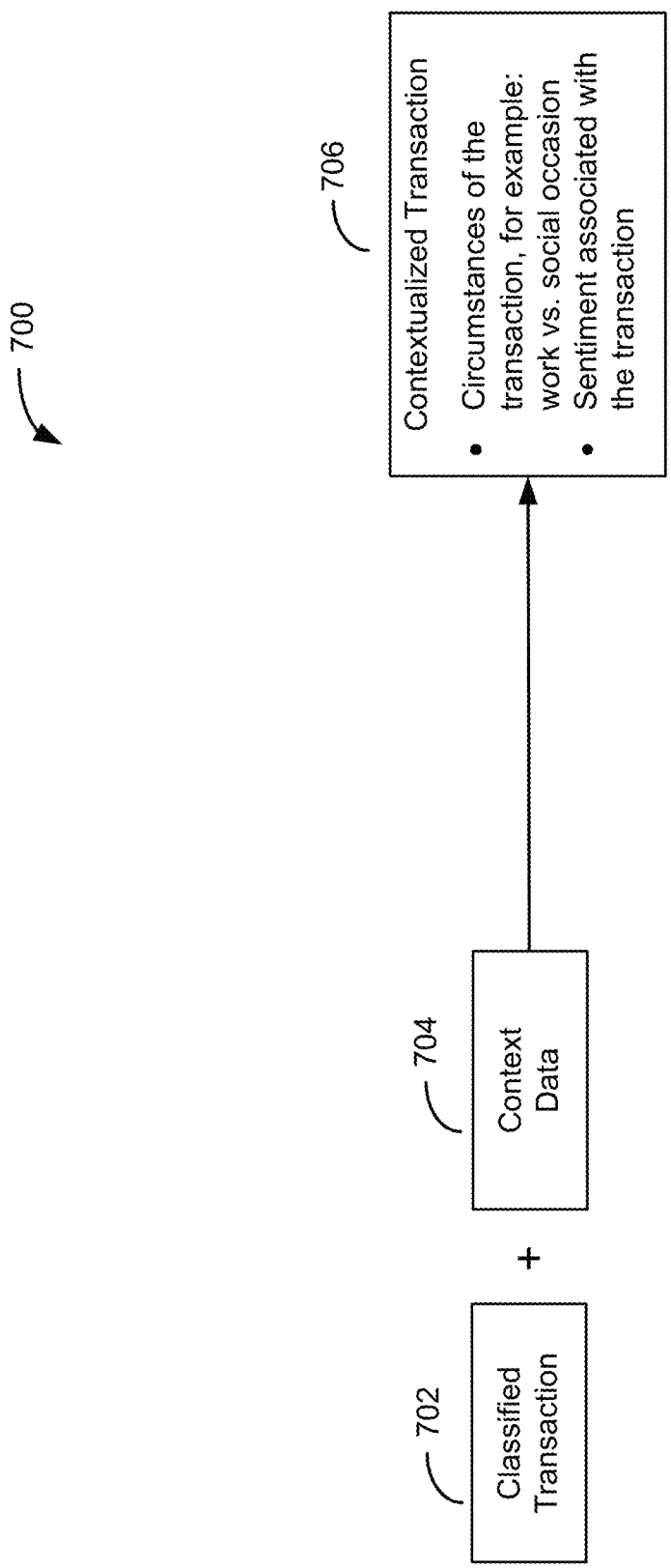
FIG. 7 illustrates an example process of augmenting data with contextual data from multiple sources, in accordance with various embodiments of the present disclosure.

FIG. 7 illustrates an example process 700 of augmenting data with contextual data from multiple sources, in accordance with various embodiments of the present disclosure. A classified transaction 702 may be augmented with context data 704 to create a contextualized transaction 706. The classified transaction 702 may be triggered by it being matched to contextual data from an additional source (geolocation, calendar, or social). The classified transaction 702 may then be augmented with new data (location, date/time, product detail, sentiment, peers, etcs) and merged into the existing transaction. A classified transaction 702 may originate as a bank transaction or an email transaction. Furthermore, when a classified transaction is matched to corresponding contextual data, additional information is augmented to the classified transaction to create a contextualized transaction, which may include circumstances of the transaction, for example whether it is a professional or social event. Additional information may also include sentiment associated with the transaction, such as whether it was "liked" on social media, upvoted or downvoted, etc.

Figure 8:
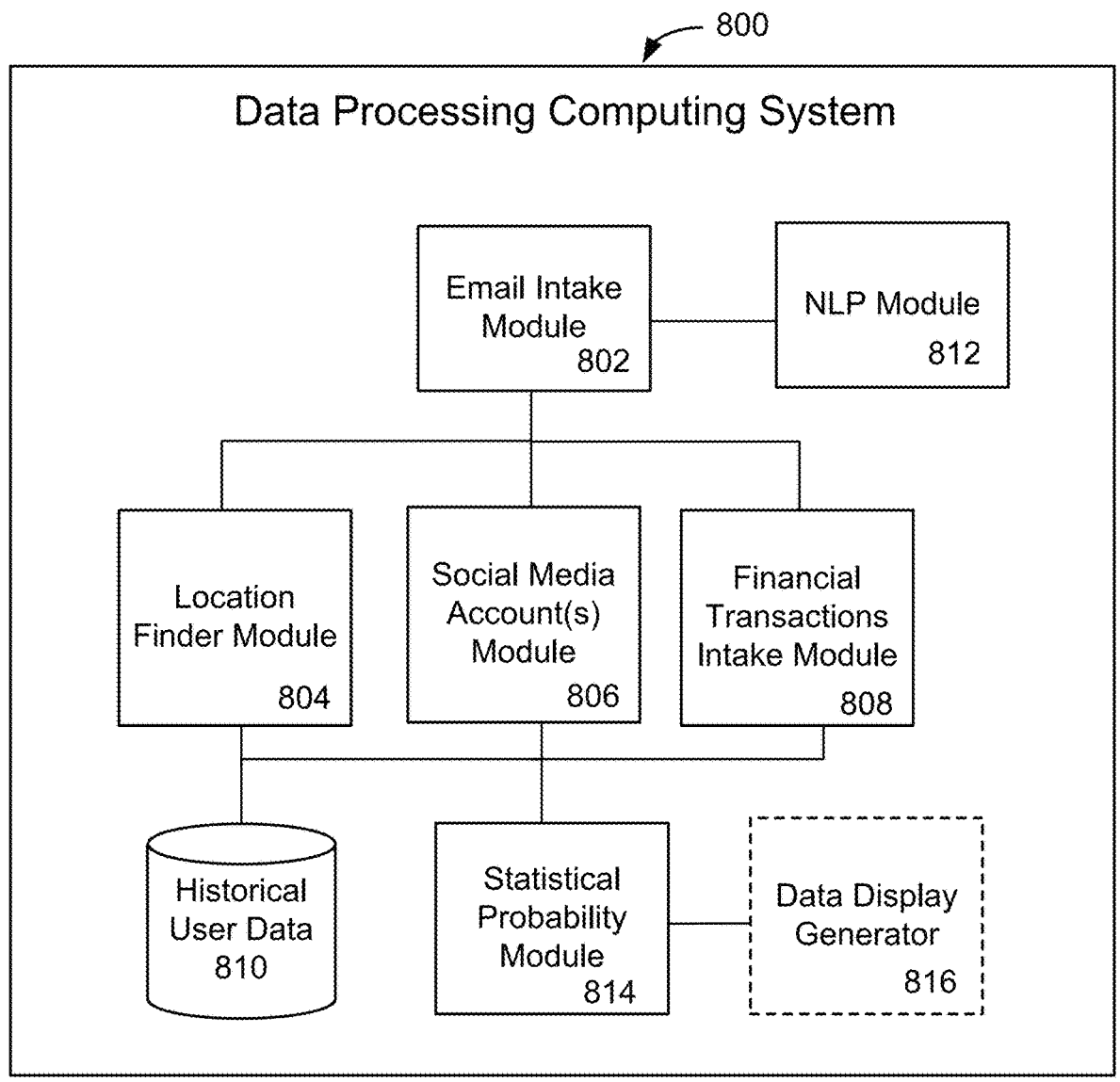
FIG. 8 illustrates an example representation of a transaction data categorizer computer, in accordance with various embodiments of the present disclosure.

FIG. 8 illustrates an example representation of a data processing computing system 800, in accordance with various embodiments of the present disclosure. The data processing computing system 800 may be comprised of the following components: an email intake processor 802 (e.g., email retriever and parser), a calendar intake module 804, a social media account(s) module 806, financial transaction intake module 808 (e.g., financial matcher), historical user data 810 (e.g., user profiler), a NLP module 812, a statistical probability module 814, and optionally, a data display generator 816, where each component performs a separate process in processing, extracting context, and augmenting transactions. The data processing computing system 800 may receive incoming transactions from a payment processing system or a bank, or any other financial institution using the financial transactions intake module 808. The data processing computing system 800 may receive incoming email transactions from an electronics communication system, or any other email service provider using the email intake module 802. Additionally or alternatively, the data processing computing system 800 may receive incoming transaction data from a calendar, or any other planning service with invitations using the calendar intake module 804. Social media transaction data may be retrieved from social media accounts and retrieved via the social media account(s) intake module 806. In some embodiments, additional context may be correlated with a historical user database 810 and/or parsed data and custom classifiers from a NLP module 812.

Figure 9:
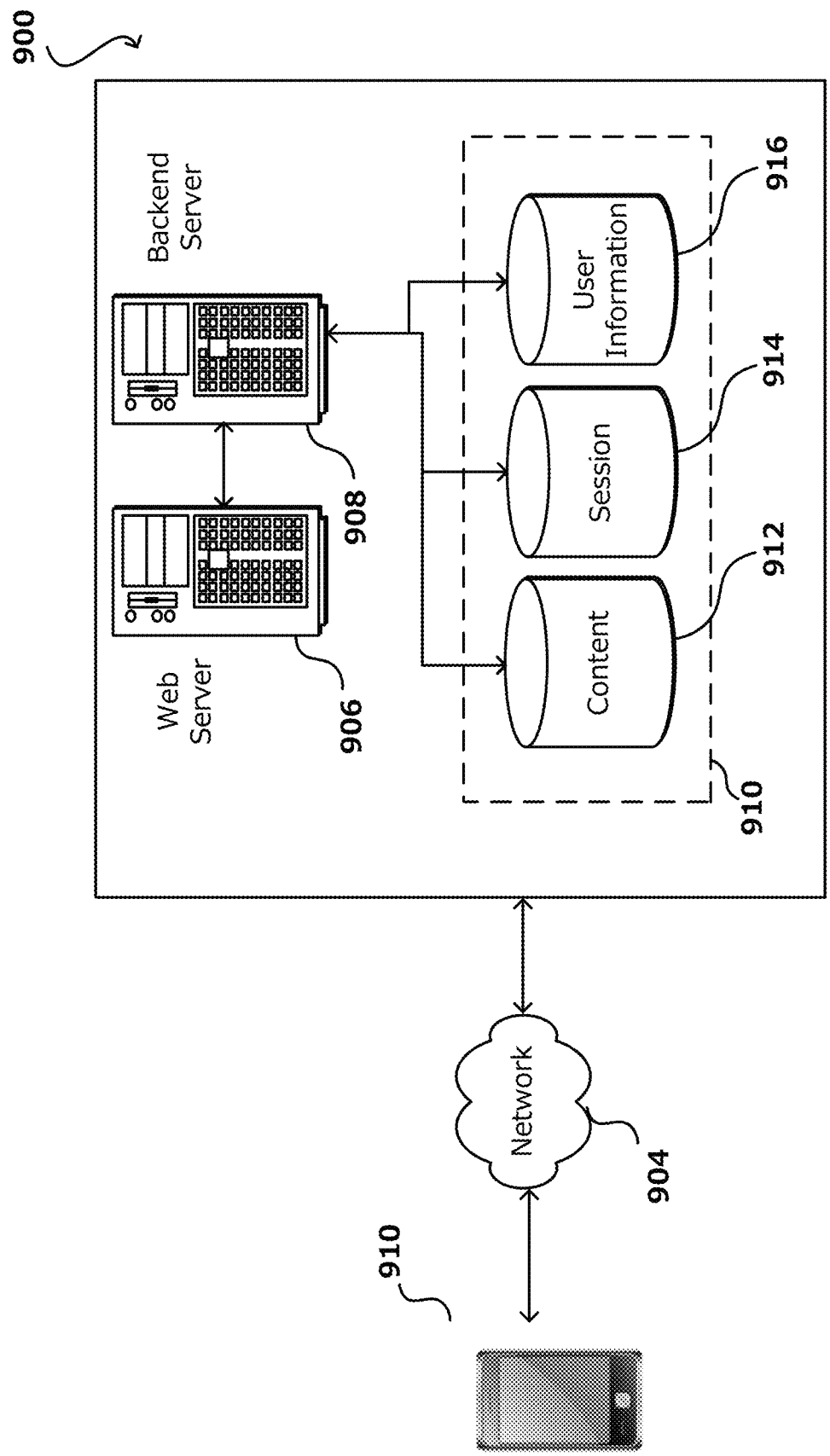
FIG. 9 illustrates an example implementation environment, in accordance with various embodiments of the present disclosure.

In accordance with various embodiments, different approaches can be implemented in various environments in accordance with the described embodiments. For example, FIG. 9 illustrates an example of an environment 900 for implementing aspects in accordance with various embodiments (e.g., a resource provider environment). As will be appreciated, although a Web-based environment is used for purposes of explanation, different environments may be used, as appropriate, to implement various embodiments. The system includes a mobile device 910, which can include any appropriate device operable to send and receive requests, messages or information over network 904 and convey information back to an appropriate device. The network can include any appropriate network, including a telephone network provided by a telecommunication operator, an intranet, the Internet, a cellular network, a local area network, wireless network, or any other such network or combination thereof. Communication over the network can be enabled via wired or wireless connections and combinations thereof. In this example, the network includes the Internet, as the environment includes a Web server 906 for receiving requests and serving content in response thereto, although for other networks, an alternative device serving a similar purpose could be used, as would be apparent to one of ordinary skill in the art.

The illustrative environment may include at least one backend server 908 and a data store 910. It should be understood that there can be several backend servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The backend server 908 can include any appropriate hardware and software for integrating with the data store 910 as needed to execute aspects of one or more applications for the client device and handling a majority of the data access and business logic for an application. The application server provides access control services in cooperation with the data store and is able to analyze audio data and other data as well as generate content such as text, graphics, audio and/or video to be transferred to the user, which may be served to the user by the Web server 906 in the form of HTML, XML or another appropriate structured language in this example. The handling of all requests and responses, as well as the delivery of content between the mobile device 910 and the backend server 908, can be handled by the Web server 906. It should be understood that the Web and application servers are not required and are merely example components, as structured code discussed herein can be executed on any appropriate device or host machine as discussed elsewhere herein.

The data store 910 may include several separate data tables, databases or other data storage mechanisms and media for storing data relating to a particular aspect. For example, the data store illustrated includes mechanisms for storing content (e.g., production data) 912 and user information 916, which can be used to serve content for the production side. The data store is also shown to include a mechanism for storing log or session data 914. It should be understood that there can be other information that may need to be stored in the data store, such as page image information and access rights information, which can be stored in any of the above listed mechanisms as appropriate or in additional mechanisms in the data store 910. The data store 910 is operable, through logic associated therewith, to receive instructions from the backend server 908 and obtain, update or otherwise process data in response thereto. Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment may be a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure. The various embodiments may be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof. In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java, C, C #or C++ or any scripting language, such as Perl, Python or TCL, as well as combinations thereof. The server(s) may also include database servers, including without limitation those commercially available from Oracle, Microsoft, Sybase and IBM. The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art.

Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display screen or keypad, microphone, camera, etc.) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc. Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, sending and retrieving computer-readable information. The system and various devices also typically will include a number of software applications, modules, services or other elements located within at least one working memory device, including an operating system and application programs such as a client application or Web browser.

It should be appreciated that alternative embodiments may have numerous variations from that described above. For example, customized hardware might also be used and/or particular elements might be implemented in hardware, software (including portable software, such as applets) or both. Further, connection to other computing devices such as network input/output devices may be employed. Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments. The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method comprising:
accessing, by a centralized data processing system, transaction data associated with a transaction processed by one of a plurality of financial services processors;
storing, by the centralized data processing system, the accessed transaction data for the transaction in a transaction data store of the centralized data processing system;
processing, by the centralized data processing system, the transaction data by retrieving account information of a user associated with the transaction;
augmenting the transaction data stored in the transaction data store with context data by:
querying, by the centralized data processing system over a network, one or more data collection systems for data maintained by the one or more data collection systems that is correlated with the user using the account information,
extracting context data indicative of information related to financial transactions from the data maintained by the one or more data collection systems correlated with the user, and
adding context data to the transaction data that is determined to match one or more characteristics of the transaction data;
augmenting the transaction data store with second transaction data for a second transaction, the second transaction not received from any of the plurality of financial services processors, by:
accessing, by the centralized data processing system, an electronic communication in a communications system communicatively coupled with the network, the communications system not associated with a financial services processor and the electronic communication sent to the user, and the electronic communication comprising one of an email message, a text message, a social media post, or a calendar entry,
analyzing the electronic communication using a natural language processing (NLP) classifier executed by the centralized data processing system, the NLP classifier trained to: identify financial transaction information within the electronic communication for categorization of the electronic communication as relevant to a financial transaction, and generate one or more tags indicative of the financial transaction information identified within the electronic communication, and
storing the one or more tags as the second transaction data for the second transaction in the transaction data store; and
transmitting, over the network, a graphical user interface to a user computing device that renders contextualized and/or augmented information indicative of at least the transaction data and the second transaction data.

2. The computer-implemented method of claim 1, further comprising:
accessing electronic communications from a set of one or more electronic communication systems;
retrieving relevant electronic communication data from the electronic communications based at least in part on one or more characteristics of the electronic communications or content of the electronic communications;
parsing the relevant electronic communication data indicating a transaction having transaction characteristics and at least one of: user characteristics, geolocation or device characteristics, or transaction processing characteristics;
categorizing, by the NLP classifier, the relevant electronic communication data with one or more classifiers based at least in part on the one or more characteristics or the content;
generating augmented transaction data based at least in part on the one or more classifiers and the transaction characteristics;
matching the augmented transaction data with one or more of the transaction processed by one of the plurality of financial services processors or the second transaction; and
adding the augmented transaction data to the transaction data or the second transaction data based on results of the matching.

3. The computer-implemented method of claim 1, wherein one of the one or more data collection systems is a transaction processing system, the method further comprising:
accessing the transaction processing system, including a transaction database of processed transactions, each processed transaction including parameters, wherein the parameters include at least an amount, date of the transaction, an associated user account, or a vendor;
matching at least one parameter of a processed transaction from the transaction database with at least one transaction characteristic from the transaction data, the new transaction data, or a combination thereof; and
augmenting the transaction data, the new transaction data, or a combination thereof with the parameters of the matched processed transaction.

4. The computer-implemented method of claim 1, further comprising:
accessing at least one of a transactions database or a user profile database;

analyzing the transaction data, the new transaction, or a combination thereof to extract a geolocation or a device characteristic;

determining characteristics context data for the transaction data, the new transaction data, or a combination thereof based at least in part on the extracted geolocation or the extracted device characteristics matching with a geolocation or device characteristic associated from at least one of the user profile database or the transactions data base; and augmenting the transaction data, the new transaction data, or a combination thereof with the characteristics context data.

5. The computer-implemented method of claim 1, further comprising:

accessing a user profile database, wherein each user profile includes user characteristics comprising at least demographic data, behavioral data, historical data, or psychographic data;

locating the user and the account information of the user in the user profile database;

analyzing the transaction data, the new transaction data, or a combination thereof to extract transaction user characteristics;

determining user profile context data for the transaction data, the new transaction data, or a combination thereof based at least in part on the extracted transaction user characteristics matching user characteristic in a user profile associated with the user; and augmenting the transaction data, the new transaction data, or a combination thereof with the user profile context data.

6. The computer-implemented method of claim 1, wherein one of the one or more data collections systems is a financial profile system, further comprising:

accessing the financial profile system, wherein the financial profile system includes a financial profile that corresponds to the user;

locating the user and the financial profile of the user in the financial profile system;

analyzing the transaction data, the new transaction data, or a combination thereof to extract financial profile characteristics;

determining financial profile context data based at least in part on the extracted financial profile characteristics matching one or more characteristics within the financial profile of the user; and augmenting the transaction data, the new transaction data, or a combination thereof with the financial profile context data.

7. The computer-implemented method of claim 1, wherein the financial transaction information recognized by the NLP classifier comprises at least one of a transaction amount, a clean vendor name, an address of the user or a vendor, a transaction date time, or a transaction product detail.

8. A computing system comprising:

a processor; and a non-transitory computer-readable medium having code executable by the processor to:

access transaction data associated with a transaction processed by one of a plurality of financial services processors;

store the accessed transaction data for the transaction in a transaction data store of the computing system;

process the transaction data by retrieving account information of a user associated with the transaction;

augment the transaction data stored in the transaction data store with context data by:

querying, over a network, one or more data collection systems for data maintained by the one or more data collection systems that is correlated with the user using the account information, extract context data indicative of information related to financial transactions from the data maintained by the one or more data collection systems correlated with the user, and adding context data to the transaction data that is determined to match one or more characteristics of the transaction data;

augment the transaction data store with second transaction data for a second transaction, the second transaction not received from any of the plurality of financial services processors, by:

accessing an electronic communication in a communications system communicatively coupled with the network, the communications system not associated with a financial services processor and the electronic communication sent to the user, and the electronic communication comprising one of an email message, a text message, a social media post, or a calendar entry, analyzing the electronic communication using a natural language processing (NLP) classifier trained to: identify financial transaction information within the electronic communication for categorization of the electronic communication as relevant to a financial transaction, and generate one or more tags indicative of the financial transaction information identified within the electronic communication, and storing the one or more tags as the second transaction data for the second transaction in the transaction data store; and transmit, over the network, a graphical user interface to a user computing device that renders contextualized and/or augmented information indicative of at least the transaction data and the second transaction data.

9. The computing system of claim 8, the non-transitory computer-readable medium further having code executable by the processor to further:

access the transaction processing system, including a transaction database of processed transactions, each processed transaction including parameters, wherein the parameters include at least an amount, date of the transaction, an associated user account, or a vendor;

match at least one parameter of a processed transaction from the transaction data base with at least one transaction characteristic from the transaction data, the new transaction data, or a combination thereof; and augment the transaction data, the new transaction data, or a combination thereof with the parameters of the matched processed transaction.

10. The computing system of claim 9, the non-transitory computer-readable medium further having code executable by the processor to further:

access electronic communications from a set of one or more electronic communication systems;

retrieve relevant electronic communication data from the electronic communications based at least in part on one or more characteristics of the electronic communications or content of the electronic communications;

parse the relevant electronic communication data indicating a transaction having transaction characteristics and at least one of: user characteristics, geolocation or device characteristics, or transaction processing characteristics;
categorize, by the NLP classifier, the relevant electronic communication data with one or more classifiers based at least in part on the one or more characteristics or the content;
generate augmented transaction data based at least in part on the one or more classifiers and the transaction characteristics;
match the augmented transaction data with one or more of the transaction processed by one of the plurality of financial services processors or the second transaction; and
add the augmented transaction data to the transaction data or the second transaction data based on results of the matching.

11. The computing system of claim 8, the non-transitory computer-readable medium further having code executable by the processor to further:
access at least one of a transactions database or a user profile database;
analyze the transaction data, the new transaction, or a combination thereof to extract a geolocation or a device characteristic;
determine characteristics context data for the transaction data, the new transaction data, or a combination thereof based at least in part on the extracted geolocation or the extracted device characteristics matching with a geolocation or device characteristic associated from at least one of the user profile database or the transactions database; and
augment the transaction data, the new transaction data, or a combination thereof with the characteristics context data.

12. The computing system of claim 8, the non-transitory computer-readable medium further having code executable by the processor to further:
access a user profile database, wherein each user profile includes user characteristics comprising at least demographic data, behavioral data, historical data, or psychographic data;
locating the user and the account information of the user in the user profile database;
analyze the transaction data, the new transaction data, or a combination thereof to extract transaction user characteristics;
determine user profile context data for the transaction data, the new transaction data, or a combination thereof based at least in part on the extracted transaction user characteristics matching user characteristic in a user profile associated with the user; and
augment the transaction data, the new transaction data, or a combination thereof with the user profile context data.

13. The computing system of claim 8, the non-transitory computer-readable medium further having code executable by the processor to further:
access a financial profile system, wherein the financial profile system includes a financial profile that corresponds to the user;
locate the user and the financial profile of the user in the financial profile system;
analyze the transaction data, the new transaction data, or a combination thereof to extract financial profile characteristics;
determine financial profile context data based at least in part on the extracted financial profile characteristics matching one or more characteristics within the financial profile of the user; and
augment the transaction data, the new transaction data, or a combination thereof with the financial profile context data.

14. A non-transitory computer readable storage medium, having instructions stored thereon, which when executed by at least one processor, cause the processor to perform operations, comprising:
accessing, by a centralized data processing system, transaction data associated with a transaction processed by one of a plurality of financial services processors;
storing, by the centralized data processing system, the received transaction data for the transaction in a transaction data store of the centralized data processing system;
processing, by the centralized data processing system, the transaction data by retrieving account information of a user associated with the transaction;
augmenting the transaction data stored in the transaction data store with context data by:
querying, by the centralized data processing system over a network, one or more data collection systems for data maintained by the one or more data collection systems that is correlated with the user using the account information,
extracting context data indicative of information related to financial transactions from the data maintained by the one or more data collection systems correlated with the user, and
adding context data to the transaction data that is determined to match one or more characteristics of the transaction data;
augmenting the transaction data store with second transaction data for a second transaction, the second transaction not received from any of the plurality of financial services processors, by:
accessing, by the centralized data processing system, an electronic communication in a communications system communicatively coupled with the network, the communications system not associated with a financial services processor and the electronic communication sent to the user, and the electronic communication comprising one of an email message, a text message, a social media post, or a calendar entry,
analyzing the electronic communication using a natural language processing (NLP) classifier executed by the centralized data processing system, the NLP classifier trained to: identify financial transaction information within the electronic communication for categorization of the electronic communication as relevant to a financial transaction, and generate one or more tags indicative of the financial transaction information identified within the electronic communication, and
storing the one or more tags as the second transaction data for the second transaction in the transaction data store; and
transmitting, over the network, a graphical user interface to a user computing device that renders contextualized and/or augmented information indicative of at least the transaction data and the second transaction data.

15. The non-transitory computer readable storage medium of claim 14, wherein the operations further comprise:
- accessing electronic communications from a set of one or more electronic communication systems;
- retrieving relevant electronic communication data from the electronic communications based at least in part on one or more characteristics of the electronic communications or content of the electronic communication;
- parsing the relevant electronic communication data indicating a transaction having transaction characteristics and at least one of: user characteristics, geolocation or device characteristics, or transaction processing characteristics;
- categorizing, by the NLP classifier, the relevant electronic communication data with one or more classifiers based at least in part on the one or more characteristics or the content;
- generating augmented transaction data based at least in part on the one or more classifiers and the transaction characteristics;
- matching the augmented transaction data with one or more of: the transaction processed by one of the plurality of financial services processors or the second transaction; and
- adding the augmented transaction data to the transaction data or the second transaction data based on results of the matching.

16. The non-transitory computer readable storage medium of claim 14, wherein one of the one or more data collection systems is a transaction processing system, the operations further comprise:
- accessing the transaction processing system, including a transaction database of processed transactions, each processed transaction including parameters, wherein the parameters include at least an amount, date of the transaction, an associated user account, or a vendor;
- matching at least one parameter of a processed transaction from the transaction database with at least one transaction characteristic from the transaction data, the new transaction data, or a combination thereof; and
- augmenting the transaction data, the new transaction data, or a combination thereof with the parameters of the matched processed transaction.

17. The non-transitory computer readable storage medium of claim 14, wherein the operations further comprise:
- accessing at least one of a transactions data base or a user profile data base; analyzing the transaction data, the new transaction, or a combination thereof to extract a geolocation or a device characteristic;
- determining characteristics context data for the transaction data, the new transaction data, or a combination thereof based at least in part on the extracted geolocation or the extracted device characteristics matching with a geolocation or device characteristic associated from at least one of the user profile database or the transactions data base; and
- augmenting the transaction data, the new transaction data, or a combination thereof with the characteristics context data.

18. The non-transitory computer readable storage medium of claim 14, wherein the operations further comprise:
- accessing a user profile database, wherein each user profile includes user characteristics comprising at least demographic data, behavioral data, historical data, or psychographic data;
- locating the user and the account information of the user in the user profile database;
- analyzing the transaction data, the new transaction data, or a combination thereof to extract transaction user characteristics;
- determining user profile context data for the transaction data, the new transaction data, or a combination thereof based at least in part on the extracted transaction user characteristics matching user characteristic in a user profile associated with the user; and
- augmenting the transaction data, the new transaction data, or a combination thereof with the user profile context data.

19. The non-transitory computer readable storage medium of claim 14, wherein one of the one or more data collections systems is a financial profile system, wherein the operations further comprise:
- accessing the financial profile system, wherein the financial profile system includes a financial profile that corresponds to the user;
- locating the user and the financial profile of the user in the financial profile system;
analyzing the transaction data, the new transaction data, or a combination thereof to extract financial profile characteristics;
- determining financial profile context data based at least in part on the extracted financial profile characteristics matching one or more characteristics within the financial profile of the user; and
- augmenting the transaction data, the new transaction data, or a combination thereof with the financial profile context data.

20. The non-transitory computer readable storage medium of claim 14, wherein the financial transaction information recognized by the NLP classifier comprises at least one of a transaction amount, a clean vendor name, an address of the user or a vendor, a transaction date time, or a transaction product detail.

* * * * *